United States Patent [19]

Parker

[11] Patent Number: 5,140,333
[45] Date of Patent: Aug. 18, 1992

[54] SYSTEM AND METHOD FOR OPERATING TRANSMIT/RECEIVE MODULES OF ACTIVE APERTURE PHASED ARRAY ANTENNAS

[75] Inventor: William J. Parker, Silver Spring, Md.

[73] Assignee: Westinghouse Electric Corp., Pittsburgh, Pa.

[21] Appl. No.: 749,054

[22] Filed: Aug. 23, 1991

[51] Int. Cl.[5] .............................................. H01Q 3/36
[52] U.S. Cl. ..................................... 342/371; 342/372; 342/375; 342/377
[58] Field of Search ............... 342/375, 368, 371, 372, 342/377

[56] References Cited

U.S. PATENT DOCUMENTS

| | | | |
|---|---|---|---|
| 4,882,589 | 11/1989 | Reisenfeld | 342/374 |
| 4,899,160 | 2/1990 | Kuwahara | 342/408 |
| 4,951,060 | 8/1990 | Cohn | 342/175 |
| 4,965,588 | 10/1990 | Lenormand et al. | 342/372 |
| 4,994,813 | 2/1991 | Shiramatsu et al. | 342/360 |

*Primary Examiner*—John B. Sotomayor
*Attorney, Agent, or Firm*—W. E. Sutcliff

[57] ABSTRACT

A system and method for controlling the times of activation and deactivation of transmit amplifiers, receiver amplifiers and receiver protectors of multiple T/R modules during successive transmit and receive cycles of an active aperture phase array antenna of a radar system. The corresponding elements of each T/R module are delayed to operate like elements simultaneously. The delayed application of this T/R signal to the like element is varied for operating unlike elements of the array at predetermined times relative to one another. A system and method for determining the required delay is disclosed.

16 Claims, 5 Drawing Sheets

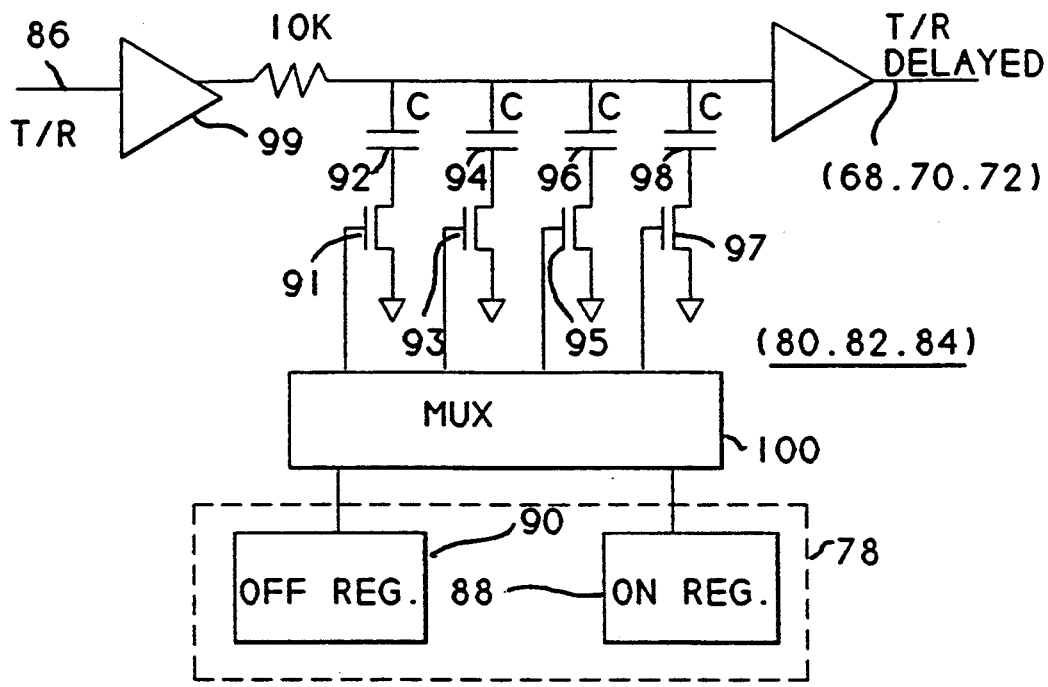
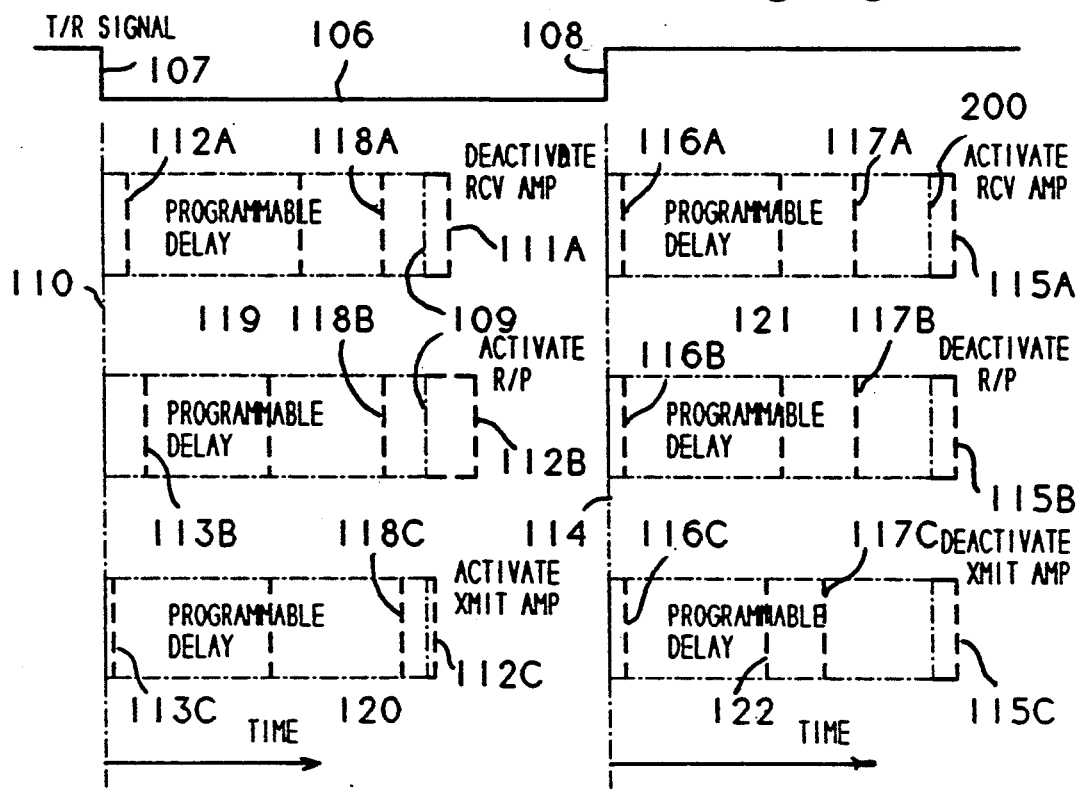

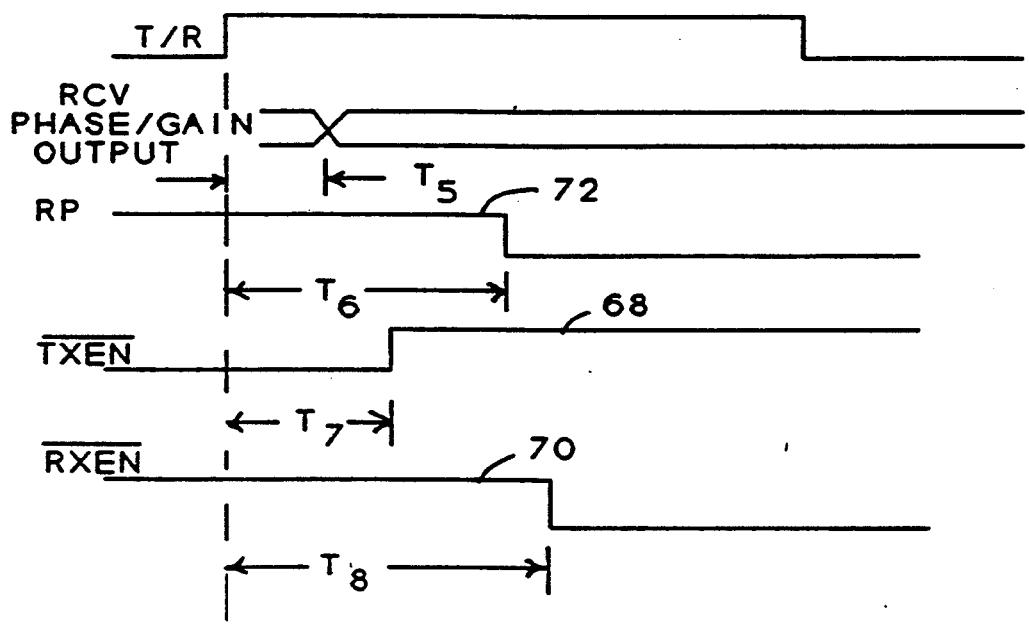
FIG. 6A
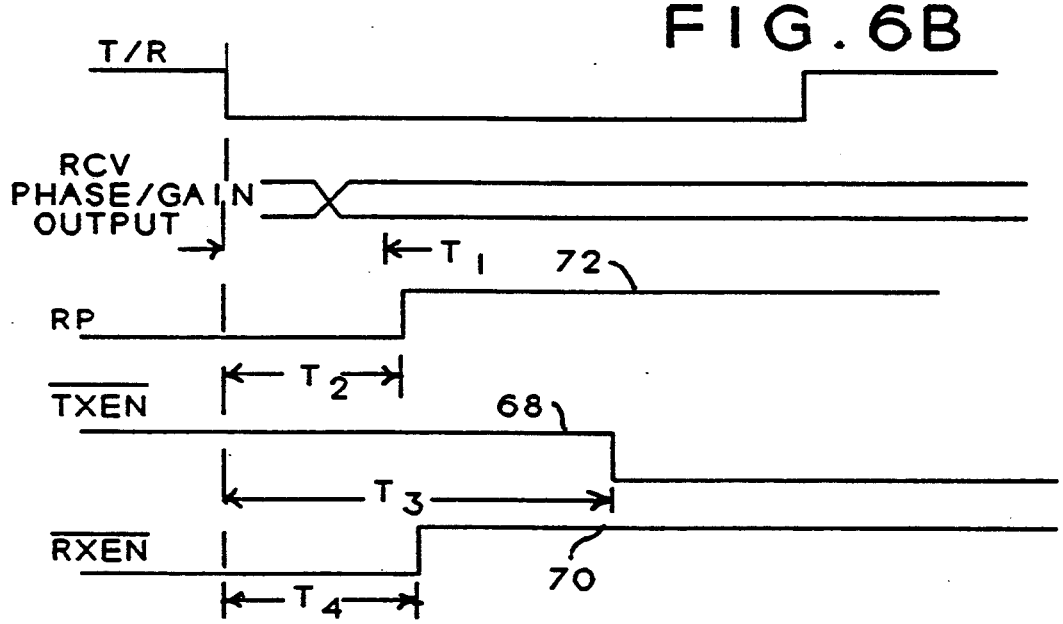
FIG. 6B
FIG. 4
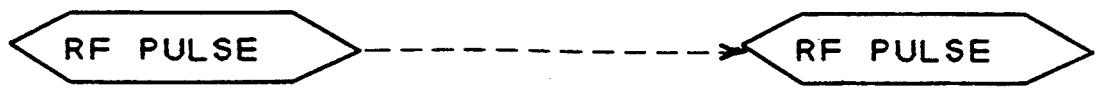

SYSTEM AND METHOD FOR OPERATING TRANSMIT/RECEIVE MODULES OF ACTIVE APERTURE PHASED ARRAY ANTENNAS

BACKGROUND OF THE INVENTION

1. Field of the Invention

The present invention relates to active phased array antennas; and more particularly, to a system and method for controlling transmit/receive modules of active aperture phased array antennas.

2. Discussion of Related Art

Active aperture phased array antennas have a multitude of radiating elements that alternately transmit RF energy and receive return energy from a target or terrain. Typically, each one of the radiating elements or apertures has an associated transmit/receive module (hereinafter referred to as a T/R module) that prepares the antenna system for each alternate transmit/receive cycle. Each T/R module typically includes a transmitter amplifier that is activated near the beginning of each transmit cycle for amplifying the RF energy transmitted during such cycle, and deactivated at the beginning of each receive cycle for permitting the elements to receive the return energy or echoes. Each T/R module also includes a receiver protector and a receiver amplifier. The receiver protector of each T/R module is activated at the beginning of each transmit cycle to prevent the transmitting RF energy from damaging the receiver, and deactivated during the receive cycle for permitting the receiver to receive the return energy. The receiver amplifier of each T/R module is deactivated at the beginning of each transmit cycle to permit the transmission of the RF energy; and activated at the beginning of each receive cycle to amplify the received return energy. An RF pulse is transmitted during each transmit cycle while the receiver amplifier as in a deactivated condition.

Typically, a single T/R signal is transmitted simultaneously to all of the T/R modules of an antenna for switching "on" or activating, and switching "off" or deactivating the transmit amplifiers, receive amplifiers, and the receiver protectors. When the T/R signal changes from a low to a high state, it marks the beginning of a receive cycle, and when it changes from a high to a low state, it marks the beginning of a transmit cycle. It is important that all the transmit amplifiers, receiver amplifiers, and the receiver protectors of all of the T/R modules of the array turn on and off simultaneously at the appropriate times during the respective transmit/receive cycles. If the different T/R modules acted at different times, the antenna would not operate as a coherent whole.

The relative timing for the activation and deactivation of the amplifiers and protectors within each individual T/R module is also important. For example, if both the receive and transmit amplifiers should be active at the same time, the antenna would be subject to oscillations. Also, if the receiver protector is off while the transmit amplifier is active, the receiver amplifier would be damaged. Even if the deviation in optimum timing produces no oscillation or component damage, system performance degradation would result. Therefore, it is important to system performance and integrity, that the activation and deactivation of the amplifier and protector elements occur at the proper time.

Although, all of the T/R modules respond to a single T/R signal, there is a significant degree of variation between T/R modules in the amount of time required to switch on and off; or in other words, activate and deactivate, the transmit and receive amplifiers, and the receiver protectors. For example, there is a great deal of variation in the response of circuit elements; that is, some power transistors switch faster than others. Also, there are variations in delays through the distribution electronics that supply the T/R signal to the T/R modules; and of course there are varying delays because of variations in wafer fabrication processes of the digital electronics that control the RF elements.

In actual practice, at the beginning of each transmit cycle, the receiver protector should be activated at the same time that the receiver amplifiers are deactivated, and certainly before the transmit amplifiers are turned on, or activated. At the beginning of each receive cycle, the transmit amplifiers should be first turned off, the receiver amplifiers activated, and the receiver protectors deactivated at a set time interval later.

It has been determined that to maximize system performance, all switching should occur within 12.5 nanoseconds of the specified time; and the required time limit for switching between a transmit and a receive cycle is one hundred nanoseconds. It has been proposed to utilize a controller regulator interface for each T/R module that makes sure the T/R module receiver amplifier is off, before it will permit the transmit amplifier to be activated, or powered up. The proposed controller includes a feedback monitor that makes sure the transmit amplifier is deactivated, or powered down, before it permits the T/R module to turn on the transistor, or switch, that supplies power to the receiver amplifier. The receiver protector is intended to be deactivated any time the receiver amplifier is activated or powered up. Although suitable for the purposes intended, this approach makes it difficult to meet the stringent system requirements because of the delays involved in monitoring the receiver amplifier before enabling the transmit amplifier. This problem also exists in switching from the receive cycle to the transmit cycle. Such an approach is also subject to variations in circuit elements as heretofore mentioned.

SUMMARY OF THE INVENTION

One of the objects of the present invention is to provide a system and method of controlling all T/R modules of an active phased array antenna so that respective transmit amplifiers, receive amplifiers, and receiver protectors of all the T/R modules of the antenna are activated and deactivated simultaneously at the appropriate times.

Another object of the present invention is to provide a system and method of controlling individual elements of the T/R modules so that proper timing is maintained within each individual T/R module.

A further object of the present invention is to provide a system and method for controlling the simultaneous operation of the corresponding elements of each T/R module and the required operation relative to one another in each respective T/R module at the system level as compared to the component level.

A further object of the present invention is to provide a system and method of controlling each T/R module in order to switch between transmit and receive cycles within approximately 100 nanoseconds, and control each module so that the amplifiers and receiver protectors operate within approximately 12 nanoseconds of the set time.

Additional objects and advantages of the invention will be set forth in part in the description which follows, and in part will be obvious from the description, or may be learned by practice of the invention. The objects and advantages of the invention may be realized and obtained by means of the instrumentalities and combinations particularly pointed out in the appended claims.

To achieve the objects and in accordance with the purpose of the invention, as embodied and broadly described herein, the method for controlling the active apertures of a phased array antenna wherein each module includes transmitter amplifier, receiver amplifier, and receiver protector elements, comprises the steps of transmitting a T/R signal simultaneously to all the elements of the array; delaying the application of the T/R signal to the array between a selected minimum and maximum time interval; delaying the application of the T/R signal to corresponding elements of the array at predetermined times between the minimum and maximum time interval for operating the like elements of the array substantially simultaneously; and varying the delayed application of the T/R signal from said predetermined times to like elements of the array for operating the unlike elements of the array at predetermined times relative to one another in each module.

In another aspect, the present invention, as embodied and broadly described herein, is a system for controlling active apertures of a phased array antenna comprising a plurality of T/R modules, each module including a transmitter amplifier, receiver amplifier, and receiver protector elements; means for transmitting a T/R signal to all the elements of the array simultaneously; a delay device for delaying application of the T/R signal to each of elements of the array between a selected minimum and maximum time interval; means for delaying the application of the T/R signal to corresponding elements of the array at predetermined times between the maximum and minimum time interval for operating like elements of the array substantially simultaneously; and means for varying the predetermined delayed application of the T/R signal to the like elements of each module for operating the unlike elements of the array at predetermined times relative to one another.

In still another aspect, the present invention as embodied and broadly described herein, comprises a system and method for determining the time intervals required to operate the elements of each module in response to the reception of a T/R signal. The method for determining the deactivation time of the transmitting amplifier, comprises generating a continuous RF signal; applying the generated RF signal to an antenna; applying a pulsed T/R signal simultaneously to a time delay detector and each of the modules individually; measuring the delay time between the receipt of each T/R signal and either the commencement or cessation of the generated RF signal; and storing the measured delay in a computer data base.

The accompanying drawings which are incorporated in and constitute a part of this specification, illustrate one embodiment of the invention and together with the description, serve to explain the principles of the invention.

BRIEF DESCRIPTION OF THE DRAWINGS

FIG. 2 is a schematic diagram of a delay device for use with each T/R module in accordance with the present invention;

FIG. 3 is a timing diagram for assisting in understanding the delay sequence in the application of a T/R signal to like and unlike elements of the array in accordance with the present invention;

FIG. 4 is a schematic representation of the timing of the RF pulses into the manifold of the antenna in accordance with the system and method of the present invention;

FIG. 6A and 6B are timing diagrams illustrating relative timing of the unlike elements of each T/R module subsequent to the reception of a respective transmit and receive signal.

DESCRIPTION OF THE PREFERRED EMBODIMENT

In the method and system of the present invention, each transmit/receive (T/R) module of an active aperture phased array antenna for a radar system includes a transmitter amplifier element, a receiver amplifier element and a receiver protector element. The transmitter amplifier element, receives amplifier element, and receiver protector element are referred to collectively herein as "elements". When referring to individual modules, the different elements of the same modules are referred to collectively as "unlike elements." When referring to the same elements in different modules of the array, such elements are referred collectively to as "like" elements.

Figure 1A:
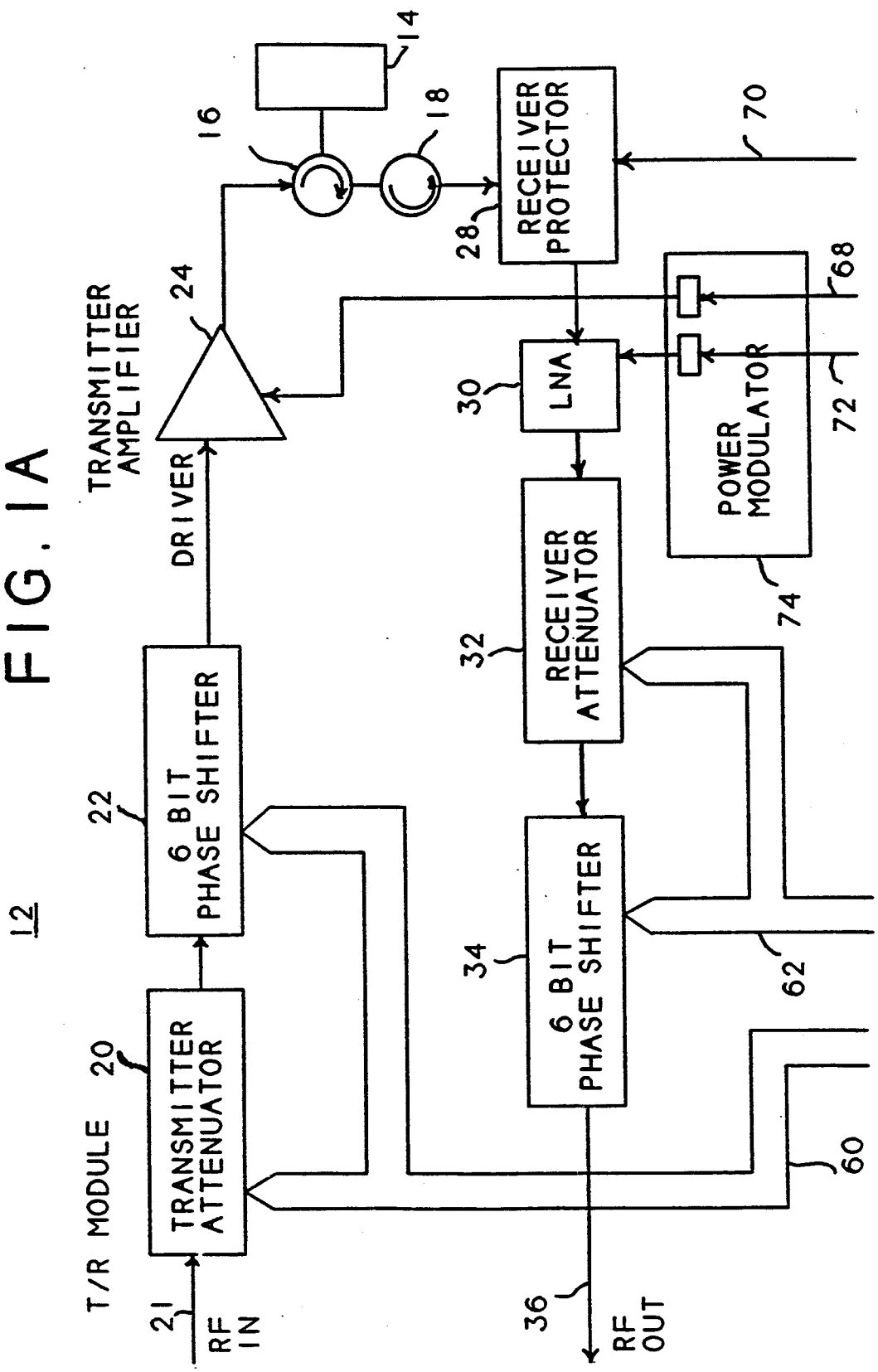
FIGS. 1A and 1B represents a schematic block diagram of a T/R module including the T/R module controller and incorporating the principles of the present invention.
Figure 1B:
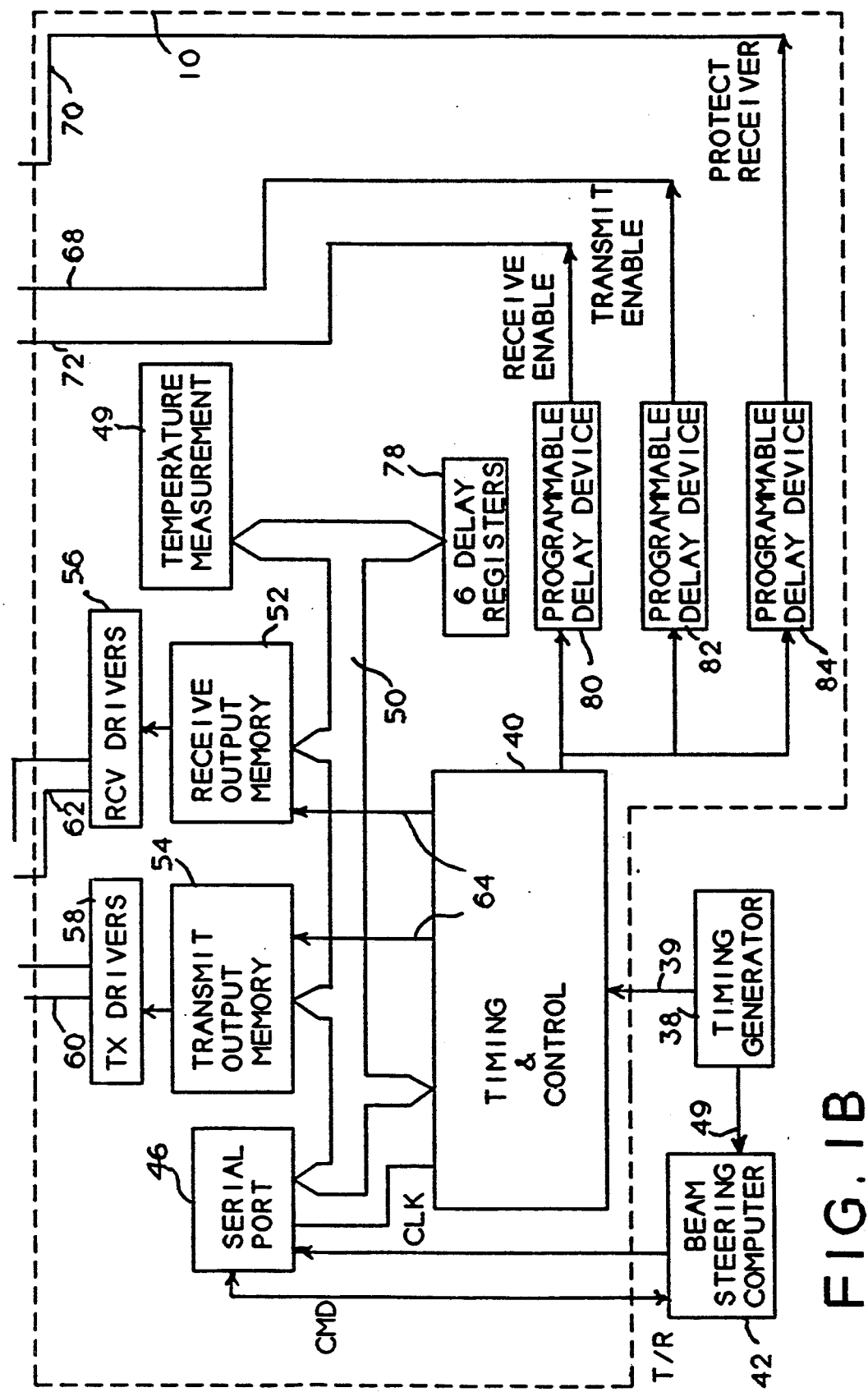

Referring to FIG. 1, and as embodied herein, a T/R module controller utilizing the principles of the present invention is illustrated within box 10; and a T/R module of the type controlled by controller 10 is referred to generally by reference numeral 12. T/R module 12 is connected to a radiating element 14 which illustrates schematically a transmission mode and a receive mode. Circulators 16 and 18 direct the transmit energy from the transmitter portion to the radiating element 14, and the return energy from the radiating element 14 to the receiver portion of the T/R module 12. The transmitter portion of T/R module 12 includes a transmitter attenuator 20 which receives RF energy over line 21 from the radar system (not shown) and having an output connected to a six bit phase shifter 22 which in turn is connected to a transmitter amplifier driver 24. Circulator 18 is connected to a receiver protector 28 which in turn is connected to a low noise amplifier 30 having an output connected to a receiver attenuator 32, which in turn is connected to a 6-bit phase shifter 34 which outputs return energy from the receiving element of the antenna over line 36 to a receiver modified (not shown), for example.

Spaced transmit and receive (T/R) signals for defining the transmit and receive cycles of the system are generated alternately by a timing generator 38 over line 39 to timing and control circuitry 40 for defining the transmit/receive cycles. Beam steering of the antenna is accomplished by a beam steering computer 42 that inputs command signals over line 44 to a serial port 46.

Clock input from computer 42 is provided over line 48. Timing generator 38 also controls the clocking of the beam steering computer over line 49. Serial port 46 is connected to bus 50 to receive output memory 52 and transmit output memory 54, which in turn are coupled to respective receive and transmit drivers 56 and 58. Transmit driver 58 is connected by bus 60 to attenuator 20 for attenuating the transmitter as commanded by computer 42. Bus 60 is also connected to phase shifter 22 for shifting the phase during each transmit cycle. Driver 56 is connected by bus 62 for attenuating the receiver at 32 as commanded by computer 42, and for shifting the phase of received energy during each receive cycle by phase shifter 34. The timing of the attenuation and phase shifting at 20, 22, 32 and 34 is controlled by timing and control processor 40 over lines 64.

In accordance with the invention, the system provides for a plurality of delay devices for delaying application of the T/R signal to the elements of the array for activating and deactivating unlike elements 24, 28, and 30 at appropriate times relative to each other, and like elements of the other T/R modules of the antenna array simultaneously over lines 68, 70, and 72 respectively. Transmitter amplifier 24 and receiver amplifier 30 are controlled through a power modulator 74 over lines 68 and 72. The timing values utilized in determining the actual delay times for activating and deactivating the elements are stored in registers 78, and involves utilizing a delay period between a maximum time interval and a minimum time interval for operating the respective element.

One form of delay device 80, 82, and 84 is shown in FIG. 2, and is in the form of a switchable resistor capacitor network. Multiplexer 100 operates switches 91, 93, 95, and 97 to connect combinations of resistor 99 and capacitors 92, 94, 96, 98 for delaying the application of the transmitted T/R signal to the respective elements from input 86 to the output over lines 68, 70, and 72. (See FIG. 1) In one actual reduction to practice, each delay device 81 was capable of providing a minimum incremental delay of eight nanoseconds (ns) and a maximum delay of 480 ns in sixty increments of 8 ns. This resolution insures that the delay lines can be adjusted for operating across the temperature range of zero to seventy-eight degrees C. The actual resolution may vary with temperature, but the delay should be consistent at any given temperature, for any given controller. Each delay device is implemented so that the various outputs can be adjusted across the appropriate ranges.

In accordance with the present invention, means including the delay devices are provided for delaying application of the T/R signal to corresponding elements of the array at predetermined times between the maximum and minimum time interval for operating like elements of the array having different operating characteristics substantially simultaneously. As herein embodied and again referring to FIG. 2, each of the six delay registers 78 of FIG. 1 includes for each of the three delay devices an ON register 88 and an OFF register 90, which provide data to multiplexer 100. Note that ON is not the same as active and OFF is not the same as inactive. The ON register simply defines an event relative to the rising edge of the T/R signal; and the register OFF defines an event relative to the falling edge of the T/R signal. Register 88 specifies the amount of delay required from the rising edge of the T/R signal on line 39 to the level change of the output signal on lines 68, 70, or 72; and register 90 specifies the amount of delay required from the falling edge of the T/R signal. The reason for having two registers 88 and 90 is to accommodate the different delays required for the same element subsequent to both the rising and falling edge of the T/R signal.

Referring to FIG. 3, line 106 represents the level of signal T/R, which switches to a low level at 107 representing the beginning of a transmit cycle and to a high level at 108 representing the beginning of a receive cycle. Line 109 between the switching points 107 and 108 of the T/R signal represents a maximum delay setting for all of the delay devices; and line 100 represents a minimum delay setting for such devices. The time between the maximum and minimum settings may be arbitrary, with the constraint that it be at least as long as the slowest operating element of the array; and is preferably the same for the receive and transmit cycles of the system. Preferably, to obtain maximum benefits from the present invention, the time between minimum and maximum settings should be substantially greater than the operating time of the slowest element.

The time between line 111A and line 109 (maximum setting) represents the actual operating time delay for deactivation of an exemplary receiver amplifier in response to the T/R signal with the delay device set at maximum setting. Line 112A represents the delay for the same element with the delay device set at the minimum setting. The time from line 110 to 111A is the total lumped delay with the delay device at maximum setting and the time from line 110 to 112A corresponds to total lumped delay with the delay device at minimum setting. As previously mentioned, the time represented by line 109 is the same maximum setting for all receiver amplifier elements of the array. The time duration between line 112B and 110 for the programmable delay block associated with the activation of the receiver protector element corresponds to the lumped delay in the activation of the receiver protector element in response to the T/R signal with the delay device set at maximum setting. The time between line 110 and 113B corresponds to the lumped delay at minimum setting. The duration of time between line 112C of the programmable delay block and line 110 represents the delay in activating the transmitter amplifier in response to the T/R signal with the delay device at maximum setting. The time represented by line 110 and 113C corresponds to the lumped delay with the delay device at minimum setting.

Similarly, line 200 represents the maximum delay setting for the delay devices associated with operation of the receiver amplifier, transmitter amplifier, and receiver protector elements during each receive cycle; and the time duration between line 114 and line 115A, line 114 and line 115B, and line 114 and 115C represents the lumped delay for activation of an exemplary receiver amplifier element, deactivation of an exemplary receiver protector element, and deactivation of an exemplary transmitter amplifier element, respectively, after reception of a T/R signal, with the associated delay device set at maximum setting. Similarly, the times between line 114 and lines 116A, 116B and 116C, represent the lumped delay with the associated delay device set at minimum setting.

The desired delay setting is the number that must be loaded into the delay register to achieve a desired lumped or operational delay.

Since the delay lines used in this embodiment are highly linear, the desired delay setting may be found by linear interpolation. The minimum setting is subtracted from the maximum setting for all the delay devices of the array, which provides the range of possible settings. The minimum setting is zero since it is the minimum value that can be loaded into the delay register. The maximum setting ($N_{max}$) is the maximum number which can be loaded into the delay register to actuate the delay device. Therefore the range of possible settings is $N_{max}$.

To obtain the total possible range of time delays ($T_R$) for the individual elements, the minimum lumped delay of each element is subtracted from the maximum lumped delay of the respective elements.

Although FIG. 3 shows the minimum time delay (lines 110 and 114) to be zero, they could be set at any 8 ns increment less than the maximum setting provided the difference provides the range of time delays required for each of the elements.

To obtain the needed added delay ($\Delta T$) from delay device for applying the T/R signal to a particular element in order that like elements of the array are operated simultaneously, the minimum lumped delay value is subtracted from the target delay. The value stored in the register for operating the particular element is arrived at in accordance with the following formula:

$$\frac{\Delta T}{T_R} \cdot N_{max} = \text{delay setting.}$$

Referring again to FIG. 3, a target delay setting, for example, is represented by lines 117A, 117B, and 117C for the elements during the receive cycle and lines 118A, 118B, and 118C for the elements during the transmit cycle. The target delay setting is the same for all of the like elements in order that they operate simultaneously; but may be different with respect to unlike elements. In order to assure the proper sequence of operation within the switching time constraints, the individual unlike elements of each module at predetermined times relative to one another.

Referring to FIGS. 6A and 6B, Receiver Protect (RP), Transmit Enable $\overline{TXEN}$, and Receive Enable $\overline{RXEN}$ correspond to signals 72, 68, and 70 respectively of FIG. 1. The signals are generated from the T/R signal by the programmable delay devices; and their function is to activate the respective circuit elements 30, 24, and 28 in the prescribed time relationship. Controller 10 is started in a state such that these outputs from 80, 82, and 84 are not enabled so that no damage occurs to the circuit elements during system start-up.

The $\overline{RXEN}$ and RP signals may be T/R inverted, while $\overline{TXEN}$ may have the same polarity as T/R. In which case RP is asserted high, while $\overline{TXEN}$ and $\overline{RXEN}$ are asserted low. This is the condition expressed in FIGS. 6A and 6B.

FIG. 6A shows the timing of the signals in relation to the rising edge of T/R. FIG. 6B shows the timing of the module controlling outputs RP, $\overline{TXEN}$, and $\overline{RXEN}$ in relation to the falling edge of the input, T/R. $T_1$ through $T_4$ are delays from the falling edge of T/R. They are defined by their context in FIG. 6B. $T_5$ through $T_8$ are delays from the rising edge of T/R and are defined by FIG. 6A. Under the current configuration, the maximum permissible rise (or fall) times of these signals is 20 ns with a load of 20 pf in parallel with a series network consisting of a 150 ohm resister and a 150 pf capacitor (See FIG. 2).

$T_1$ is the time delay from the falling edge of T/R to when the new Transmit phase and gain outputs are valid, that is, at the selected minimum delay of the array at the start of the transmit cycle. $T_5$ is the time delay from the rising edge of T/R to when the new Receive phase and gain outputs are valid, that is, at the start of the minimum delay of the receive cycle. $T_0$ specifies the minimum values of $T_1$ and $T_5$ as shown below:

$$T_0 = (TBD) \text{ ns}$$
$$T_1 = T_0 +/- 8 \text{ ns}$$
$$T_5 = T_0 +/- 8 \text{ ns}$$

where (TBD) is to be determined from the minimum delay, characteristics of the integrated circuit technology being employed.

The present invention includes means for varying the delayed application of the T/R signal to all like elements equally for operating unlike elements of the each T/R module at predetermined times relative to one another between the minimum and maximum time interval. Like elements are operated simultaneously in response to the T/R signal at the expiration of a time interval that corresponds to the operating delay of the individual corresponding elements, and the unlike elements are operated at predetermined times relative to one another by increasing and/or decreasing the delay times of all the devices associated with like elements by the same value.

The amplifiers and receiver protectors of the individual modules are operated at required times relative to one another after the occurrence of the rising and falling edge of the T/R control signal.

The present invention may also include for certain applications a temperature sensor or measurement device 89, (see FIG. 1) which either adds to or subtracts from the stored delay values in the registers to compensate for the temperature effects on the operation of the T/R elements.

Temperature sensor 89 shall be capable of making measurements from 0° C. to 95° C. in 3° C. increments. The accuracy shall be plus or minus 1.5° C. This results in the requirement that the serial port 40 must be able to send at least 5 temperature bits, which is coded as an integer.

Temperature sensor 89 may use an (8 MHz) CLK, which is available when commands are being clocked into the timing and control 40. Therefore an iterative ladder approach to temperature measurement is feasible. Under that approach, the previous temperature measurement could be incremented or decremented up to a certain number of LSB, every time a communication is sent to the timing and control 40. It is also acceptable to implement the temperature sensor using a process for varying temperature offset, which can be measured to calibrate absolute temperature.

The method of the present invention also includes the timing of each RF pulse to coincide with the activation of the transmitter amplifier. As shown in FIG. 4, the pulse train is shifted so that the complete pulse of a predetermined duration is visible on a device such as an oscilloscope during activation of the transmitter.

Figure 5A:
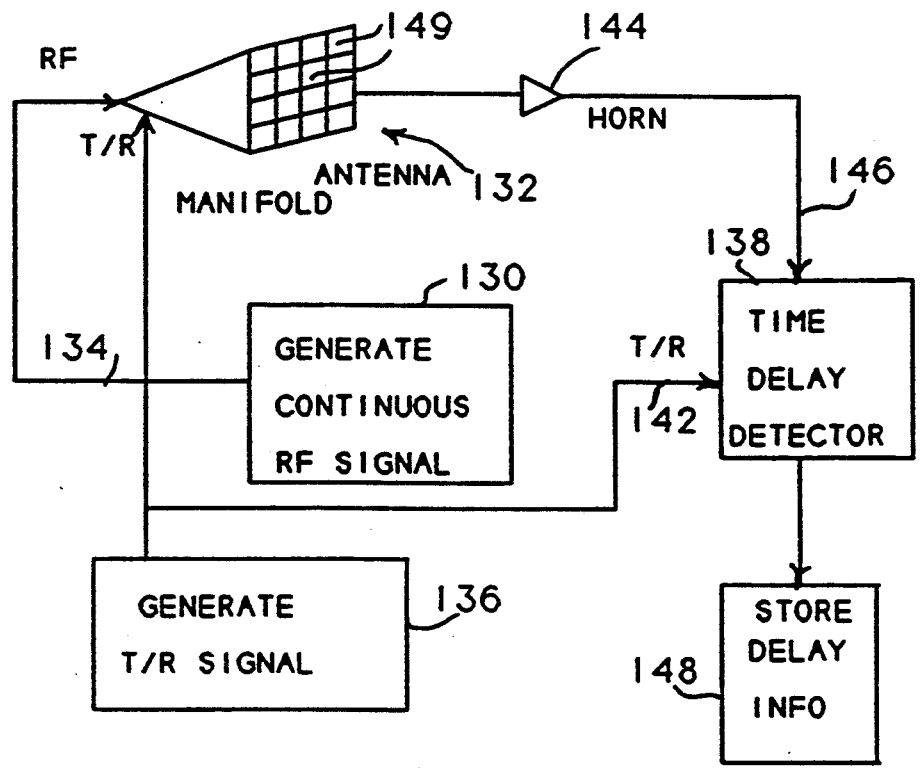
FIGS. 5A and 5B are schematic block diagrams of a method and system for determining the appropriate delay times for applying the T/R signal to the elements of the T/R modules in accordance with the present invention.

The present invention includes a system and method for determining the time intervals required to operate the elements of each module in response to the reception of a T/R signal. As herein embodied and referring to FIG. 5A, which is arranged to calibrate the activation and deactivation of the transmitter amplifier element, a continuous RF signal is generated at block 130, which is connected to the manifold of an antenna 132 by line 134. A pulsed T/R signal is generated at block 136, which is applied to antenna 132 and to a time delay detector represented by block 138, over lines 140 and 142, respectively. Time delay detector 138 detects and measures the delay time between the receipt of each pulsed T/R signal and the generated RF signal, which is broadcast by antenna 132 through horn 144 to detector 138 over input 146. The measured delay and other data as hereinafter mentioned is stored in a computer data base as represented at block 148. In determining the delay time, the delay times for each of modules 149 are addressed and accessed individually. The delay device (see FIG. 2) for activation of the transmitter amplifier element being calibrated is first set to the minimum possible delay. The receiver amplifier is deactivated and the receiver protector activated. A low value T/R signal pulse from block 136 is applied simultaneously to time delay detector 138 and antenna 132. The T/R signal to the antenna activates the transmitter amplifier being calibrated. The difference between the time of receipt of the T/R signal at detector 138 and the RF signal from the antenna, less the delay associated with the test equipment, is then determined, with the value being stored in a computer data base. This value is a measure of the minimum possible delay for activation of the transmitter amplifier element of the module being addressed. The delay element associated is then programmed to the maximum possible delay, and the same measurements are taken. This value is the total maximum delay for the activation of the transmitter amplifier element; that is, the total delay from the falling edge of the T/R signal to the activation of the transmitter amplifier. To measure the shortest and longest times for deactivation of the transmitter amplifier, the same procedure is followed as for the activation of the transmitter amplifier. However, instead of determining the differences between the time a pulsed signal reaches detector 138 from the antenna, and the time it reaches it from block 136; the time is measured from the rising edge of the T/R pulse; and the reception of the pulse causes cessation of the continuous RF signal from block 130.

Figure 5B:
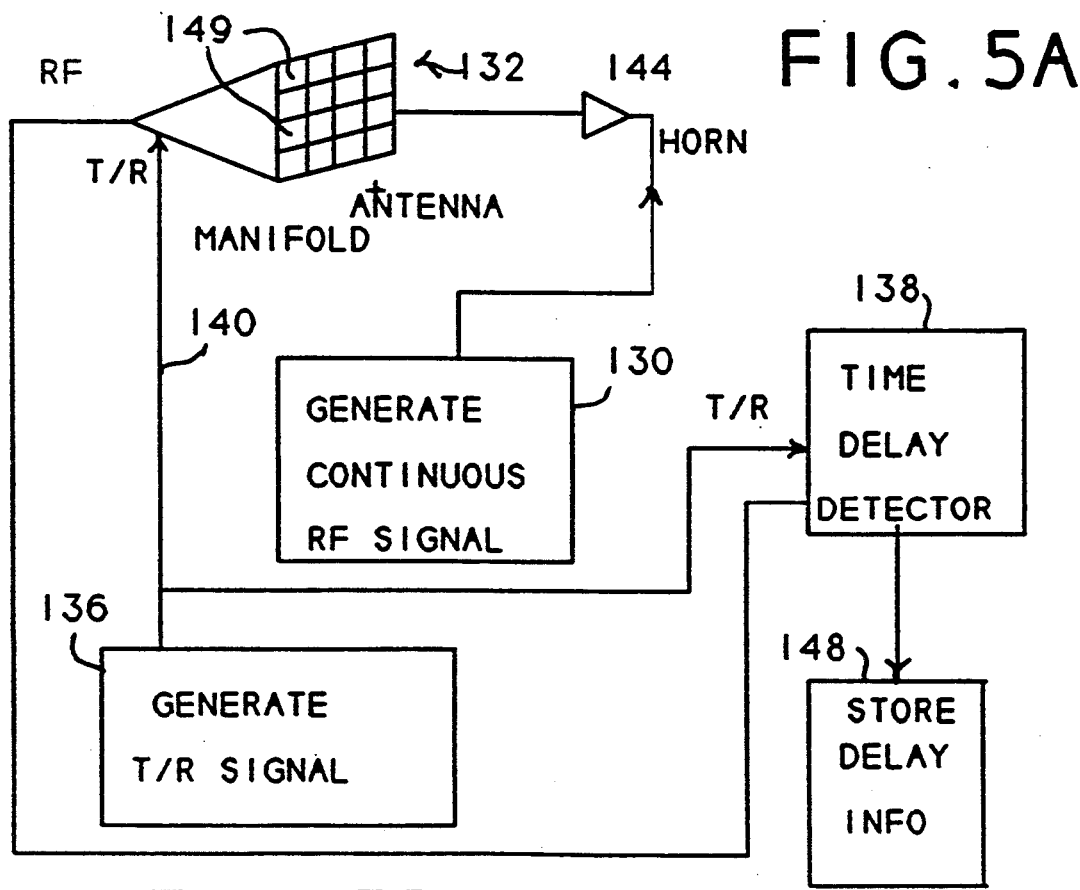

Referring to FIG. 5B where like elements have like reference characters, the procedure for calibrating the delay device associated with the activation of the receiver protectors requires that antenna horn 144 transmit continuous RF energy to antenna 132. The procedure also requires the transmitter amplifiers to be deactivated; and except for the T/R module being addressed, it requires the receiver protector elements to be activated, and the receiver amplifier elements deactivated. With the receiver amplifier activated, the receiver protector delay device is set to the minimum possible delay. The T/R signal is pulsed to deactivate the receiver protector. The time between the pulsing of the T/R signal and the receipt of the RF energy is measured to determine the delay characteristics in deactivating the receiver protector. The same measurement is taken with the delay device set to its maximum setting; and both values stored in the computer data base represented by block 148. The same procedure is used to measure the delay time for activating the receiver protector; except the measurement is taken between the receipt of the pulse and the cessation of the RF energy. In calibrating the receiver amplifier element, the same procedure is followed for the calibration of the receiver protector element, except that the receiver protector is continuously deactivated in the module being calibrated; and the receiver amplifier is gated on and off in response to the T/R signal.

The values obtained and stored as above described may be used in determining the range of the delays that may be used in operating unlike elements relative to one another at required times during each transmit and receive cycle. This delay may be referred to as a lumped delay, for unlike elements which is a single delay value for all of the like elements of the modules.

The only real constraints in choosing the lumped delays to be used within the operational antenna, is that the calibration data indicate that the chosen lumped delay for like elements fall within a range that all the like elements can achieve; that the lumped delays chosen for sets of like elements are in the required relative time relationship to the lumped delay for sets of unlike elements based on requirements for antenna performance; and that the calibration data indicate that it is possible to place the lumped delay for sets of unlike elements in the aforementioned required relative time relationship based on the measurement data. The measurement data used to make the decision may be specific data gathered from the antenna, under consideration, or may be determined using statistical methods based on data taken from other antennas produced in substantially the same way. It is also beneficial if changes in the lumped delay should occur because of aging, for example, the system can be readjusted by merely changing the deviant elements, and it is likely that the same delay is satisfactory for all of the modules in production. Also, when installing new modules, only the new modules would need calibrating, instead of the whole array. Once the total lumped delay for the particular event has been determined as previously described, the value to be loaded in the particular register can be determined in several ways. If the delay line is linear, the value can be found by linear interpolation as previously described, knowing the desired lumped delay, the minimum delay, the maximum delay and the operating delay of the element in the range. The value can also be found by taking an educated guess of the value that will result in the desired lumped delay; measure the resulting actual lumped delay; and then increment or decrement this value in the register until the resulting measured lumped delay best approximates the desired lumped delay. A third approach is to measure the lumped delay for each value that can be loaded into the delay register. To calibrate an operational antenna, load the value in the register that results in the closest approximation of the desired lumped delay.

It would be apparent to those skilled in the art that various modifications and variations can be made in the system and method of the present invention. Thus, it is intended that the present invention cover the modifications and variations in this invention provided they come within the scope of the appended claims and their equivalents.

What is claimed is:

1. A method for controlling the active apertures of a phased array antenna of a radar transmitting RF pulses wherein each module of a plurality of modules includes a transmitter amplifier, a receiver amplifier, and a receiver protector element constituting unlike elements that are operated in response to a T/R signal during successive transmit/receive cycles of the radar, the transmitter amplifier elements of the array of modules, the receiver amplifier elements of the array, and the receiver protector elements of the array, each constituting like elements, the method comprising the steps of:

transmitting a T/R signal simultaneously to all the elements of the array;

delaying the application of the T/R signal to the array between a selected minimum and maximum time interval;

delaying the application of the T/R signal to corresponding elements of the array at predetermined times between the minimum and maximum time interval for operating like elements of the array substantially simultaneously;

varying the delayed application of the T/R signal to the like elements of the array for operating the unlike elements of the array at predetermined times relative to one another during the transmit/receive cycles; and adjusting the time of occurrence of the RF pulses to the antenna manifold for transmitting the RF pulses during the simultaneous operation of the transmit amplifiers of the array.

2. The method of claim 1 wherein the step of adjusting the time of occurrence includes maximizing the width of each RF pulse of the radar during activation of the transmitter amplifier.

3. The method of claim 1 wherein the step of delaying the application of the T/R signal to like and unlike elements of the array between the minimum and maximum time interval comprises the substep of determining the operating delay of each of the elements, and determining a maximum and minimum delay time for operating the like elements in accordance with the determined operating delay.

4. The method of claim 3 wherein the step of determining the operating delay time of each module element in response to the reception of a T/R signal comprises generating a continuous RF signal; applying the generated RF signal to an antenna; applying a pulsed T/R signal simultaneously to a time delay detector and each of the modules individually; measuring the delay time between the receipt of each T/R signal and the RF signal; and storing the measured delay in a computer data base.

5. The method of claim 3 wherein the step of determining the delay time comprises determining a value corresponding to a minimum delay time and a value corresponding to a maximum delay time for each element of the array.

6. A method of controlling the operating time in response to the reception of a pulsed T/R signal, of a plurality of like elements in a plurality of T/R modules for an active aperture phased array antenna wherein each T/R module includes a plurality of unlike elements; the method comprising:

providing a delay device for delaying selectively the reception of each pulsed T/R signal by the elements of the T/R modules, each said delay device having a plurality of selectable delay increments between a minimum and maximum range;

determining and storing values corresponding to a selected minimum operating delay and a selected maximum operating delay for each of the elements of the plurality of T/R modules, the minimum operating delay corresponding to the operating delay together with a selected minimum increment of the delay device, the maximum operating delay corresponding to the operating delay together with a selected maximum incremental delay;

determining and storing selected delay values falling between the minimum and maximum stored operating delays of all the elements of the array, for selecting the increment of delay of each respective elements; and operating each of the elements of the array in accordance with a selected delay increment for operating the like elements of the array substantially simultaneously and the unlike elements of each module at predetermined times relative to one another.

7. The method of claim 6 wherein the step of determining and storing selected delay values of all the elements includes determining and storing a selected value for the activation of each element of the array and determining and storing a selected value for the deactivation of each element of the array.

8. The method of claim 6 wherein the step of determining the selected delay values of all of the elements includes selecting a value for each of the elements corresponding to $$\frac{\Delta T}{T_R} \cdot N_{max} \quad \text{where } \Delta T \text{ corresponds}$$

to the additional delay required of the delay device; $T_R$ corresponds to the total possible range of time delays and $N_{max}$ is the range of possible delay values.

9. The method of claim 6 wherein the step of determining values corresponding to selected minimum and maximum operating delays, comprises the substeps of selecting each element of each T/R module of the array in succession, setting the delay device for each selected element to a maximum and a minimum setting in succession;

generating a continuous RF signal;

generating a pulsed T/R signal for operating a selected element of the array to either transmit or receive the generated RF signal through the antenna;

applying each pulsed T/R signal directly to a time delay detector;

measuring the difference in the direct receipt of the T/R signal and the RF signal from the antenna by the time delay detector; and storing values corresponding to the measured difference, for the maximum and minimum delay settings.

10. In a radar for transmitting RF pulses during each transmit cycle and for receiving echoes of the transmitted RF pulses during each receive cycle, a system for controlling the operating time in response to the reception of pulsed T/R signals, of a plurality of like elements in a plurality of T/R modules for an active aperture phased array antenna having a manifold, wherein each T/R module includes a plurality of unlike elements, one of the unlike elements of each module being a transmitter amplifier; the system comprising:

a delay device for delaying selectively the reception of each pulsed T/R signal by the elements of the T/R modules, each said delay device having a plurality of selectable delay increments between a minimum and maximum range;

means for determining and storing values corresponding to a selected minimum operating delay and a selected maximum operating delay for each of the elements of the plurality of T/R modules, the minimum operating delay corresponding to the operating delay together with a selected minimum increment of the delay device, the maximum operating delay corresponding to the operating delay together with a selected maximum incremental delay;

means for determining and storing selected delay values falling between the minimum and maximum stored operating delays of all the elements of the array, for selecting the increment of delay of each respective elements;

means for operating each of the elements of the array in accordance with a selected delay increment for operating the like elements of the array substantially simultaneously and the unlike elements of each module at predetermined times relative to one another; and means for adjusting the time of occurrence of the RF pulses of the antenna manifold for transmitting the RF pulses during the simultaneous operation of the transmitter amplifiers of the array.

11. The system of claim 10 wherein the means for determining and storing selected delay values of all the elements includes determining and storing a selected value for the activation of each element of the array and for determining and storing a selected value for the deactivation of each element of the array.

12. The system of claim 10 wherein the means for determining the selected delay values of all of the elements includes means for selecting a value for each of the elements corresponding to $$\frac{\Delta T}{T_R} \cdot N_{max} \quad \text{where } \Delta T \text{ corresponds}$$

to the additional delay required of the delay device; $T_R$ corresponds to the total possible range of time delays and $N_{max}$ is the range of possible delay values.

13. The system of claim 10 wherein the means for determining values corresponding to selected minimum and maximum operating delays, comprises:

means for selecting each element of each T/R module of the array in succession, setting the delay device for each selected element to a maximum in a minimum setting in succession generating a continuous RF signal;

means for setting the delay device for each selected element to a maximum and a minimum setting in succession;

means for generating a continuous RF signal;

means for generating a pulsed T/R signal for operating a selected element of the array to either transmit or receive the generated RF signal through the antenna;

means for applying the generated pulsed T/R signal directly to a time delay detector;

means for measuring the difference in the direct receipt of the T/R signal and the RF signal from the antenna by the time delay detector; and means for storing values corresponding to the measured difference, for the maximum and minimum delay settings.

14. A system for controlling active apertures of a phased array antenna comprising:

a plurality of T/R modules each said module including a transmitter amplifier element, a receiver amplifier element, and a receiver protector element, the elements of each T/R module constituting unlike elements, each plurality of the transmitter amplifier elements of the array, each plurality of the receiver amplifier elements of the array, and each plurality of receiver protector elements of the array constituting like elements;

means for transmitting a T/R signal to all the like and unlike elements of the array simultaneously;

delay means for delaying application of the T/R signal to the like and unlike elements of the array between a selected minimum and maximum time interval;

means for delaying the application of the T/R signal to corresponding elements of the array at predetermined times between the minimum and maximum time interval for operating like elements of the array substantially simultaneously; and means for varying the delayed application of the T/R signal to the like elements of the array for operating the unlike elements of the array at predetermined times relative to one another.

15. The system of claim 14 further comprising means for determining the operating delay time for all the elements of the array, and the means for delaying the application of the T/R signal includes means for delaying said application a predetermined time corresponding to the operating delay.

16. A system for controlling active apertures of a phased array antenna comprising:

a plurality of T/R modules each said module including a transmitter amplifier element, a receiver amplifier element, and a receiver protector element, the elements of each T/R module constituting unlike elements, each plurality of the transmitter amplifier elements of the array, each plurality of the receiver amplifier elements of the array, and each plurality of receiver protector elements of the array constituting like elements;

means for transmitting a T/R signal to all the like and unlike elements of the array simultaneously;

delay means for delaying application of the T/R signal to the like and unlike elements of the array between a selected minimum and maximum time interval; and means for delaying the application of the T/R signal to corresponding elements of the array at predetermined times between the minimum and maximum time interval for operating like elements of the array substantially simultaneously and for varying the delayed application of the T/R signal to the like elements of the array for operating the unlike elements of the array at predetermined times relative to one another, whereby compensation for the unequal or unknown delay commencing from the generation of the T/R signal until the elements of the array are operated, is effected such that like elements are operated simultaneously and unlike elements are operated in accordance with predetermined time relationships.

* * * * *